United States Patent [19]
Telle

[11] Patent Number: 5,808,747
[45] Date of Patent: Sep. 15, 1998

[54] APPARATUS AND METHOD FOR PRODUCTION OF SIGNATURES

[75] Inventor: Lawrence Bruce Telle, Greece, N.Y.

[73] Assignee: Eastman Kodak Company, Rochester, N.Y.

[21] Appl. No.: 655,550

[22] Filed: May 30, 1996

[51] Int. Cl.⁶ .............................. H04N 1/00; H04N 1/40; G03G 21/00
[52] U.S. Cl. .......................................... 358/296; 358/444
[58] Field of Search ................................ 358/296, 401, 358/444, 468; 395/115–117; 399/1, 2, 83

[56] References Cited

U.S. PATENT DOCUMENTS

| | | | |
|---|---|---|---|
| 4,672,462 | 6/1987 | Yamada | 358/401 |
| 4,712,906 | 12/1987 | Bothner et al. . | |
| 4,814,822 | 3/1989 | Acquaviva et al. . | |
| 4,963,894 | 10/1990 | Lebeau et al. | 358/296 |
| 5,047,955 | 9/1991 | Shope et al. | 395/116 X |
| 5,057,869 | 10/1991 | Graves et al. . | |
| 5,102,110 | 4/1992 | Reynolds . | |
| 5,105,283 | 4/1992 | Forest et al. | 358/444 X |
| 5,241,474 | 8/1993 | Marovac . | |
| 5,260,758 | 11/1993 | Stemmle . | |
| 5,271,065 | 12/1993 | Rourke et al. | 395/117 X |
| 5,301,036 | 4/1994 | Barrett et al. | 358/444 X |
| 5,398,289 | 3/1995 | Rourke et al. | 395/117 X |
| 5,623,585 | 4/1997 | Matias et al. | 395/115 |

FOREIGN PATENT DOCUMENTS

| | | |
|---|---|---|
| 0083989 A2 | 1/1983 | European Pat. Off. . |
| 0309196 A1 | 9/1988 | European Pat. Off. . |
| 0477569 A2 | 8/1991 | European Pat. Off. . |
| 2128843 | 8/1983 | United Kingdom . |
| 2247803 | 6/1991 | United Kingdom . |

OTHER PUBLICATIONS

US application Ser. Nos. 08/581,025 and 08/579,749.

*Primary Examiner*—Eric Frahm
*Attorney, Agent, or Firm*—Norman Rushefsky

[57] ABSTRACT

In a copier/printer, production of signatures with high productivity is provided by storing in a job image buffer (JIB) image data in compressed form representing multiple pages of an original image to be reproduced as signatures. When a signature page is to be printed, the image data for one of two pages to be printed as a signature is output from the JIB by expanding the image data from compressed form to a rasterized form. The rasterized data is then output to a secondary buffer memory (SBM). There is subsequently output to the SBM from the JIB rasterized data of a second of the two pages to be combined into a signature. The two pages in the SBM are assembled to form an assembled data set of image data from the two pages. There is then output to a writer rasterized lines of image data representing data from the assembled data set wherein a rasterized line includes image data from the two pages of the original image. Thus, high productivity is achieved by printing the rasterized lines of data in a fast scan direction of the writer to form an image of the assembled page.

29 Claims, 8 Drawing Sheets

APPARATUS AND METHOD FOR PRODUCTION OF SIGNATURES

BACKGROUND OF THE INVENTION

1. Field of the Invention

This invention relates to copier/printers and, more particularly, to methods and apparatus for electronic printing of signatures, e.g., booklets or pamphlets.

2. Brief Description Relative to the Prior Art

The production of signatures has been an aspect of printer/copier development that has seen constant improvement. A major reason for this is the complexity of the printing operation if this is to be done with processes requiring significant operator intervention. What provides this complexity is the ordering of pages printed since it does not follow the normal order of the document. For example, a 12-page document original of 8 ½"×11" (21.59 cm×27.94 cm) size pages to be produced in signatures with four different 8 ½"×5 ½" (21.59 cm×13.97 cm) images on each printed sheet requires a reduction of each original image and an ordering of printing of the original pages that is quite different from the page order of the originals. The ordering of printing will also be affected by the nature of the duplex operation; e.g., are all first sides printed first and then second sides or are second sides printed before some first sides are printed or some other order.

Prior to the introduction of sophisticated copier/printers such as described by Forest et al in U.S. Pat. No. 5,105,283, the generation of signatures from hardcopy document originals could be made by a copier machine being programmed to reorder the document pages in an appropriate order for copying as signatures. Thus, Acquaviva et al in U.S. Pat. No. 4,814,822 taught that an original multi-page document may have the pages automatically reordered and then copied in the appropriate order for production of signatures.

Forest et al describes a copier wherein the original hard copies need not be reordered before their scanning, but that high productivity can be obtained by electronic manipulation of the set of rasterized images that are stored after scanning of the documents in their original order. This was a significant improvement over the prior art in terms of not only eliminating significant operator intervention on the formation of these signature copies but also providing increased productivity for copying since time was being wasted in reordering originals for the signature production copying mode.

Rourke et al in U.S. Pat. No. 5,271,065 also discloses electronic manipulation of the rasterized image data for electronic printing of signature copies. In Rourke et al, images are automatically electronically scanned in the order they are originally provided to the platen and then electronically manipulated in the order for printing before being sent to the writer. In the image manipulation process, the data for the entire document is recast electronically in the order for printing before any part of the copying operation is sent to the writer. I have recognized that this is an obviously inefficient use of a marking engine since this requires memory not only for the original job but the entire recast job. At first blush, this inefficiency appears necessary because certain pages need to be printed simultaneously. For example, to enhance productivity, it is preferred to print 8 ½"×11" sheets with the long direction of the sheet in a direction perpendicular to the direction of movement of the sheet. Where signature mode is operative, this implies that a raster line sent to the writer will be comprised of image data from two different original pages. Thus, the mindset in the industry is that after scanning of a document original, it is necessary to reassemble the data for the entire document in memory and then send out the raster lines of image data and accept, grudgingly, the inherent inefficiencies this presents. However, after considering this problem, and how such might be overcome I have devised an improved method and apparatus which overcomes this problem and allows for printing of signatures without the need for totally recasting the rasterized image data of the entire document set before commencing printing. Additional advantages and objects of the invention will become apparent from a reading of the description herein.

SUMMARY OF THE INVENTION

In accordance with one aspect of the invention, there is provided a reproduction method comprising storing in a job image buffer (JIB) image data representing multiple pages of an original to be reproduced as a signature; outputting from the JIB rasterized data of one of two pages of the original to be combined into a signature; outputting from the JIB rasterized data of a second of two pages to be combined into a signature; buffering data from the two pages; outputting to a writer rasterized lines of image data representing data from the two pages wherein a rasterized line includes image data from the two pages of the original image; and printing the rasterized lines of data in a fast scan direction of the writer to form an image of the two pages.

In accordance with a second aspect of the invention, there is provided a reproduction apparatus comprising a first buffer for storing image data representing multiple pages of an original image to be reproduced as signatures; means for assembling data from one page and the second page in a second buffer to form an assembled data set of image data from the two pages; means for outputting to a writer means rasterized lines of image data representing data from the assembled data set wherein a rasterized line includes image data from the two pages of the original image; and writer means for printing the rasterized lines of data in a fast scan direction of the writer means to form an image of the assembled page.

BRIEF DESCRIPTION OF THE DRAWINGS

The subsequent description of the preferred embodiments of the present invention refers to the attached drawings wherein.

DETAILED DESCRIPTION OF THE PREFERRED EMBODIMENT

Because electrophotographic reproduction apparatus are well known, the present description will be directed in particular to elements forming part of or cooperating more directly with the present invention. Apparatus not specifically shown or described herein are selectable from those known in the prior art.

Description below is provided of an electrophotographic reproduction apparatus that is operable in both copier and printer modes. As used herein, the term "copier" is meant to refer to apparatus arranged for reading the image information on an original document sheet and for reproducing such image information on a receiver or copy sheet, each of which is a "hard copy." The term "printer" is meant to refer to apparatus arranged for receiving image information in other than hard copy form, referred to as electronic form, and for reproducing such image information on a receiver sheet. The term "original" is meant to refer to image information to be reproduced, whether such image information is in hard copy, electronic or other form. The term "reproduction apparatus" is meant to refer to copiers and/or printers. The term "reproduction method" is meant to refer to generating of hard copies by copiers and/or printers. The term "print job" is used in its conventional sense and implies operation of the apparatus in a printer mode to produce one or more hard copy sets of data in accordance with predetermined parameters requested for producing said copy sets. The data may represent one or more pages of data. The term "copy job" is used in its conventional sense and implies operation of the apparatus in a copier mode to produce one or more hard copy sets from a job requiring copying of an original document having one or more hard copy pages in accordance with predetermined parameters requested for producing said copy sets. The term "printing" refers to the production of hard copy pages of either a "copy job" or a "print job" using a marking engine.

A typical job represents a request to either print or copy a page or a sequence of pages. Where it represents a sequence of pages, the pages will be collated as a group or output finished such as by folding and/or stapling.

Figure 1:
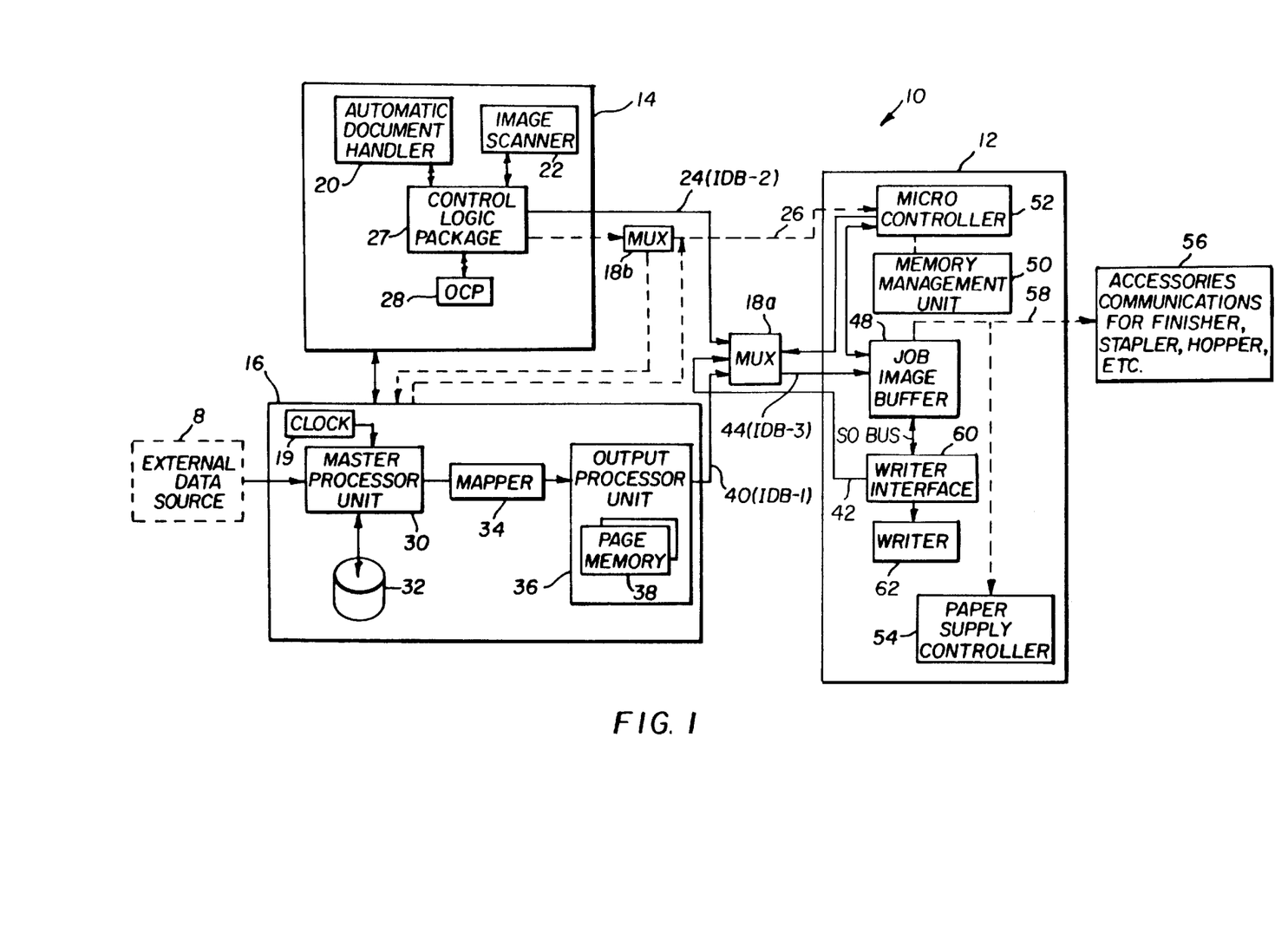
FIG. 1 is a schematic in block diagram form of a copier/printer apparatus in accordance with the invention.
Figure 2:
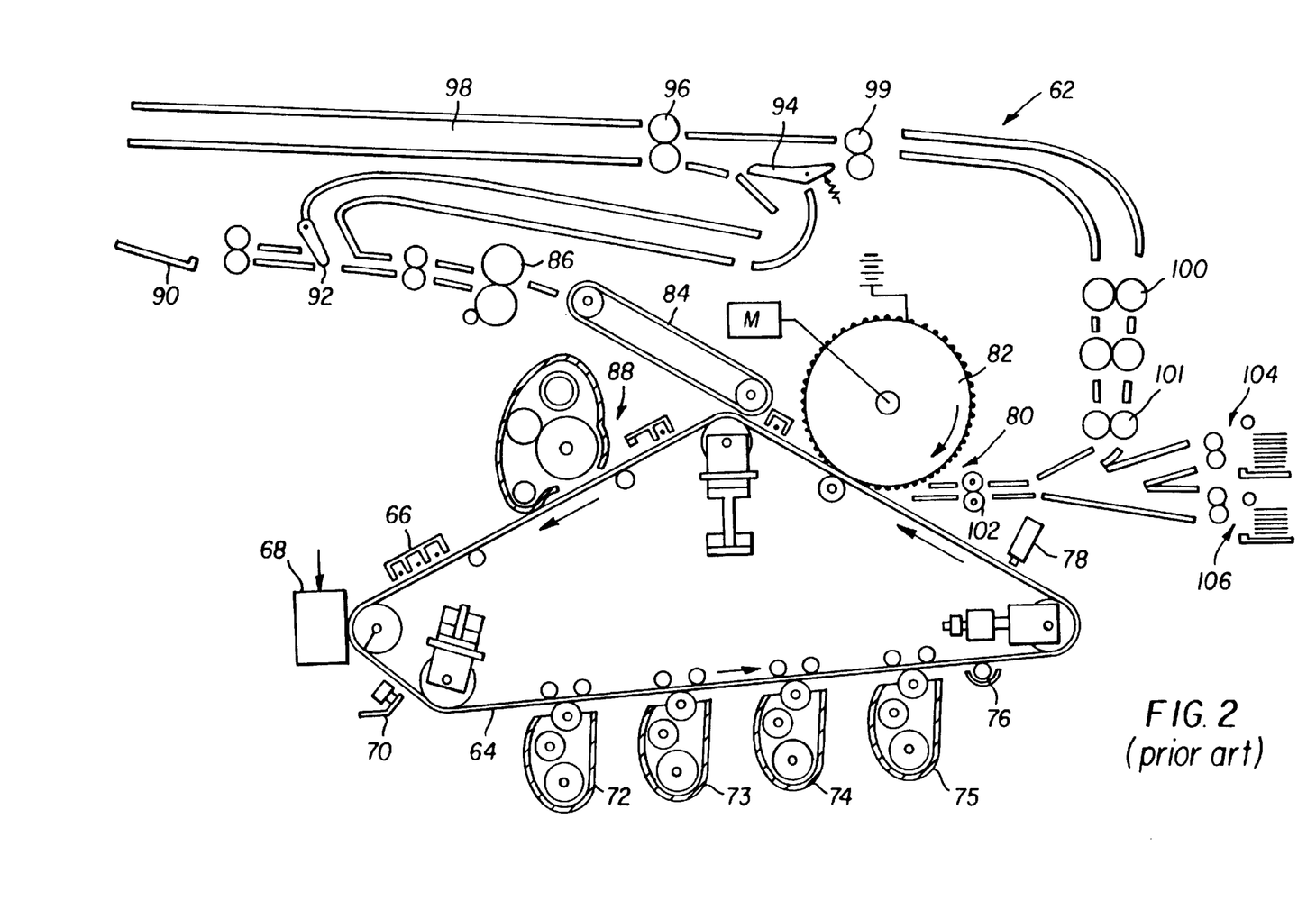
FIG. 2 is a schematic elevational view of a prior art writer forming a part of a marking engine used in the apparatus in FIG. 1.

According to FIGS. 1 and 2, copier/printer reproduction apparatus 10 includes a marking engine 12, a scanner 14, a raster image processor (RIP) 16, and multiplexers 18a and 18b, for selecting or multiplexing respective inputs to the marking engine 12.

An original document reader such as scanner 14 is arranged for producing a series of electrical signals representative of the image content of original document sheets. Scanner 14 is comprised of an automatic document handler 20 for stream feeding in serial fashion hard copy original pages to a platen or scanning station to be automatically read by an image scanner 22 such as a linear array of solid state charge-coupled devices. In lieu of feeding document sheets to the platen, documents such as books or sheets may be placed on the platen. The solid state device scans the original pages, converting their images to a series of electrical signals in page format for input to a buffer memory forming part of the image scanner 22. In response to a signal from the RIP 16 to the multiplexer 18a, the image data and signals identifying separate scan lines are transmitted along an image data bus 24 (IDB-2) to the marking engine 12 via multiplexer 18a. Signals representing coded messages and providing page information and other marking engine control information identifying requirements for the job are transmitted along a job control communications link 26 to the marking engine 12. When the RIP 16 is operative, a multiplexer 18b causes these messages to be sent to the RIP and then from the RIP to the marking engine. When the RIP is non-operating, messages form the scanner are sent via the multiplexer 18b directly to the marking engine 12.

Scanner 14 includes a control logic package 27 having an operator control panel (OCP) 28 for the operator to input functions using keys and a display to allow the operator to receive messages from the reproduction apparatus. Setup instructions for a copy job are input by the operator using the OCP and interpreted by the control logic package which then sends coded messages via link 26 for finishing and processing to the marking engine 12. The logic package comprises control software, interface software and logic and computer hardware including memory. Functions inputted by the operator at the control panel provide for operation of the apparatus in various copying modes well known in the prior art to perform various copying jobs in accordance with the inputted parameters for each copy job. Such functions might include simplex or duplex copying, magnification or reduction number of copies, image editing, receiver sheets sizes selected, etc. and in this example, various signature modes as will be described.

Raster image processor 16 includes a master processor unit 30 which receives high level commands and data in character code or other form from an external electronic data source 8 which may be one or more of a main frame computer, network link, data processing work station, removable memory media, or the like. The commands are translated into machine control language by the master processing unit 30. A job buffer 32 stores incoming jobs and program codes for use by the master processing unit.

After interpreting a job, master processing unit 30 parcels the job to a mapper 34, which converts the character code data to a pixel pattern map. For color prints, the mapper separates the information into four raster patterns, one for each color available at marking engine 12.

When the pixel pattern map is rasterized, mapper 34 sends page information to an output processor unit 36. The output processor unit has page memory 38, which stores image planes for transmission to the marking engine 12.

The processed image data and signals identifying separate raster lines are transmitted along an image data bus 40 to multiplexer 18a. Signals representing coded messages that provide page information and other marking engine control information are transmitted along the job control communications link 26.

The marking engine 12 receives bit stream image data over a bus 44 and job control data over the communications link 26. The image data is stored in a multiple page buffer or job image buffer (JIB) memory 48 under the control of a memory management unit 50.

Control means, including a micro controller 52 having one or more microprocessors, is arranged to perform arithmetic and logic operations and instruction decoding for operation of the marking engine 12 as well as controlling the time allocation of peripherals (such as a paper supply controller 54 and accessories 56) through a machine control communications link 58. Several output functions may be available for receiver sheets, including selection of output trays, stapling, sorting, folding, finishing, mailbox, envelope receiver, etc. Programming of a number of commercially available microprocessors is a conventional skill well understood in the art. This disclosure is written to enable a programmer having ordinary skill in the art to produce an appropriate control program for the microprocessor(s). The particular details of any such program would, of course, depend on the architecture of the designated microprocessor.

After appropriate processing, the data is input to a writer interface 60 and an LED writer 62 for forming images on receiver sheets.

According to FIG. 2, the LED writer 62 of marking engine 12 includes an image bearing member, for example, either a drum or preferably an endless electrophotoconductive web 64 entrained about a series of primary rollers and other supporting structure. Web 64 is driven by a motor driven roller through a series of electrophotographic stations generally well known in the art. More specifically, a uniform charge is laid down on the web by a charging station 66. The uniformly charged web moves around one of the rollers, which is directly opposite an LED printhead 68 which LED printhead selectively image-wise exposes web 64 in a manner well known in the art to form an electrostatic latent image. The web then moves into operative relation with an electrometer 70 which senses the level of a charge existing after exposure of the web by printhead 68, to help control the process.

The web then moves into operative relation with a series of toning or developing stations 72, 73, 74 and 75. Each image created by printhead 68 is toned by one of the toning stations. After being toned, the web passes a magnetic scavenger 76 which removes excess iron particles picked up in the toning process. After the electrostatic image has been toned, the web passes under densitometer 78 which measures the density of the toner image also for use in controlling the process. The toner image then proceeds to a transfer station 80 where the image is transferred to a transfer surface of a receiver sheet carried by a transfer drum 82.

As thoroughly discussed in U.S. Pat. No. 4,712,906, consecutive images in different colors are transferred in registry to a receiver sheet. The receiver sheet is wrapped on transfer drum 82 and recirculated on the surface of the drum into transfer relation with the consecutive images to create a multicolor image on the sheets. To improve efficiency, large sheets, for example, "ledger" size sheets are placed on the drum with the small dimension parallel to the axis of the drum and wrapped substantially around the transfer drum. Small sheets, for example, "letter" size sheets are placed with their long dimension parallel to the axis of the drum. Since the short dimension of letter size sheets is approximately half the long dimension of ledger size sheets, two letter size sheets are placed on the drum in approximately the same space as the single ledger size sheet. When the apparatus is operating in a multi-image mode, for example, a multi-color mode, consecutive images or pairs of images are toned with different colored toners using the different toning stations 72–75. These consecutive images are transferred in register to the receiver sheet as it repeatedly is brought into transfer relation with web 64 by drum 82. After the transfer operation is complete, the receiver sheet is allowed to follow the web, for example, by removing the vacuum holding it to drum 82 or by stripping the sheet with a skive, or other conventional stripping mechanism or both. The receiver sheet is separated from the web with the aid of an electrostatic sheet transport mechanism 84 and is transported to a fuser 86. The web is then cleaned by the application of a neutralizing corona and a neutralizing erase lamp and a magnetic brush cleaning mechanism all located at a cleaning station 88.

After the receiver sheet leaves fuser 86 it can go directly to an output tray 90 or be deflected by a deflector 92 into a duplex path according to the position of deflector 92, the position of which is controlled by the logic of the apparatus through means not shown. The duplex path moves the sheet by rollers and guides directing it first through a passive deflector 94 into turn-around rollers 96. Turn-around rollers 96 are independently driven to drive the receiver sheet into turn-around guide means 98, until the trailing edge thereof has been sensed by an appropriate sensor, not shown, to have passed passive deflector 94. Once the trailing edge has passed passive deflector 94, turn-around rollers 96 are reversed and the receiver sheet is driven by rollers 96 and other sets of drive rollers 99, 100, and 101 back to a position upstream of transfer station 80. The receiver sheet can pass through registration mechanism for correcting for skew, cross track misalignment and intrack misalignment and ultimately stop at timing rollers 102.

Transfer station 80 receives sheets from any of three sources. First, it can receive sheets of one particular size from a first supply 104, which first supply may include, for example, letter size sheets being fed with their short dimension parallel with the direction of feed. Second, it may receive sheets from a second supply, 106, which, for example, may include ledger size sheets with their long dimension parallel to the direction of movement. Third, the transfer station may receive sheets from the duplex path which may include either size sheet and would already contain a fused image on its upper side. The receiver sheets from whatever source, stop against timing rollers 102. In response to a signal from the logic and control of the apparatus, not shown, timing rollers 102 accelerate to drive the receiver sheet into the nip between the transfer drum 82 and the web as the first toner image to be transferred approaches the nip.

The duplex path is of a length that takes multiple sheets at one time depending on the length of the sheets. For example, four letter size sheets may be in the duplex path at one time or two ledger size sheets. If the printer is printing different images on different sheets, the logic and control of the apparatus must supply the necessary programming to the exposure and toning stations so that the sheets ultimately fed to output tray 90 are in the correct order considering the number of sheets that must be in the duplex path.

In operation of the copier mode, control logic package 27 starts in a sub-routine pre-programmed according to the switches on control panel 28 to command scanner 14 to begin operation. Automatic document handler 20 is activated to move seriatim document sheets into an exposure station of image scanner 22.

As the scanning of the document sheets progresses, data (including image information and control signals) are received by job image buffer 48. As subsequent original document sheets are scanned, the processes described above are repeated until all of the original document sheets have been scanned and the data therefrom stored in job image buffer 48.

More specifically, the job image buffer memory is an interface to a writer for storing in rasterized form or more preferably compressed rasterized form the information to be printed or copied. The buffer may, for example, have a capacity for storing image data for printing or copying about 50 pages. While this is more than enough necessary for most reproduction jobs, at times there are jobs that require about this amount of memory or more.

One function of a multiple-page image buffer 48 is to store all the pages of a particular job so that plural sets of collated pages may be produced without re-scanning the set of originals for each set produced. Thus, data for each page in a copy set to be printed is sent to the writer interface 60 and, after the copy set is printed, data for each page in a second copy set is sent to the writer interface. Thus collated copy sets can be produced even without use of a sorter. As such, automatic document handler 20 need not be capable of recirculating the originals.

In a standard copier mode or printer mode of operation, the latent images imaged by the LED printhead are aligned on web 64 such as to allow an orderly repetitive process of exposure and transfer to receiver sheets. Documents are sequentially imaged onto the photoconductive surface with consistent reference to frame marks on the web.

Figure 3:
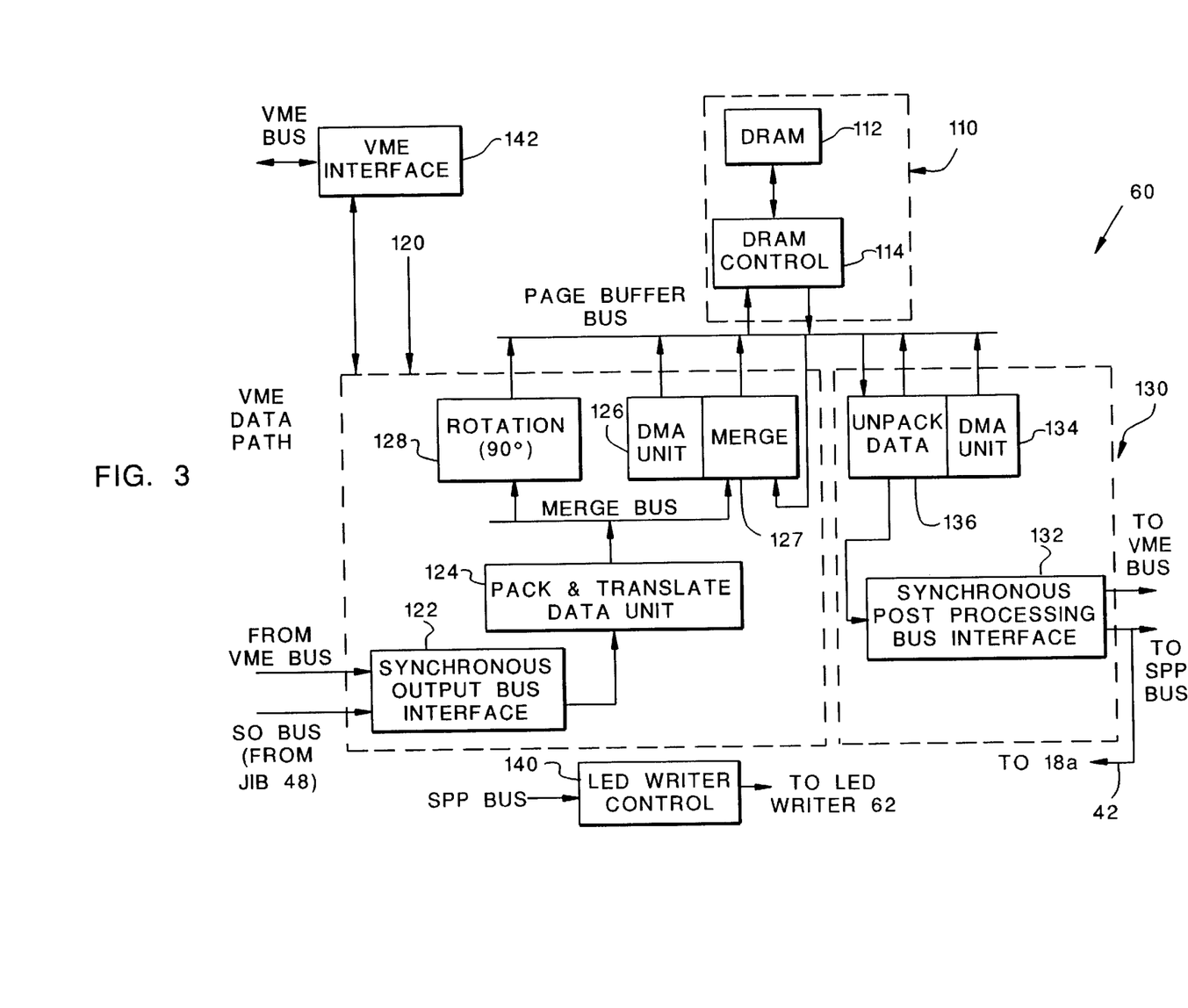
FIG. 3 is a schematic of a post-processing board or portion of a writer interface forming a part of a marking engine shown in FIG. 1.

With reference now to FIG. 3, as pages of a job are to be printed they are output from the JIB 48. When in the JIB, the pages of rasterized data are compressed and stored in compressed rasterized form. The JIB may include RAM memory and/or disk memory or other forms of accessible read/write memory. Typically, disk memory is provided to inexpensively increase the size of the JIB memory but this type of memory usually operates slower than RAM. Data for a page 12 to be printed is output from the JIB where it is expanded back into rasterized form and placed on a synchronous output bus (SO Bus) for input to a post-processing board (PPB) forming a part of writer interface 60. The PPB may be considered to be comprised of three operational blocks. The first block is the memory block 110 and is comprised of a DRAM type of memory 112 of sufficient memory capacity to store data for at least two pages of the largest paper size to be used with the apparatus. Assume the largest paper size is 11"×17" (27.9 cm×43.2 cm) the memory if made to a capacity of 256M bytes can support data of 8-bits/pixel for two of such sheets. This will allow data for one page to be output from the JIB while a page of data is being output from memory 112 to the printhead control 140. Read and write operations to memory 112 are controlled by DRAM control 114. As a page of data is output from the JIB, it is placed on the SO Bus and input to an input block 120. The input block 120 includes an SO Bus interface which receives and buffers data from both the SO Bus and from a VME Bus to be described. The data buffered in the interface 122 is sent to a pack and translate block 124 which packs the data into 64-bit words and translates the data into appropriate pixel bit depth, i.e., in this example, data may be a bit depth of 1, 2,4 or 8-bits per pixel. The output of the pack and translate data block is input to a Merge Unit 127. The merge unit is capable of merging data from the pack and translate unit 124 with data from the DRAM memory 112. Examples of data to be merged include the data from a page to be printed as well as other data such as page number data, time and date stamp, etc. Typically, merger operations involve logical operations to data that are well known in the art. A DMA (direct memory access) unit 126 is provided for moving data to and from Merge Unit 127. Where rotations of data by 90° are desirable, the block 127 may also include a rotation unit 128 which can take data from the pack and translate data unit or block 124 and rotate this data by 90° for input to the DRAM memory 112 via a page buffer bus. Access between the memory block 110 and the input and output blocks 120, 130 is through the page buffer bus.

The output block 130 includes an unpack data unit 136 which receives data from DRAM memory 112 via the page buffer bus in 64-bit words and reforms it to 16 or 32-bit size words suited for the LED writer control 140. Examples of LED writer controls are described in commonly assigned U.S. application Ser. Nos. 08/581,025 and 08/579,749, U.S. Pat. No. 5,739,841, the details of which are not essential to this invention since other types of writers such as lasers may be used. A DMA Unit 134 is also associated with the Unpack Data Unit 136 to move data to and from the Unpack Data Unit. Data from the Unpack Data Unit is buffered for transmission to the LED writer control by a synchronous post processing (SPP) bus interface unit 132 outputs the data onto the SPP bus for synchronous transmission to the LED writer control 140. Outputs from the LED writer control 140 are to an LED printhead 68. Also associated with the writer interface is a VME Bus (V) which is employed to provide diagnostic signals and control signals.

In the discussion provided above, reference is made to the term mini-pamphlet mode. As used herein, this term refers to formation of pamphlets wherein data from two original pages (hardcopy or electronic form) is printed on the same side of a receiver sheet and wherein data for these two pages have lines of data that fall on the same line in the fast scan direction of the writer. This definition will become apparent in view of the following description relative to FIGS. 4.

Figure 4:
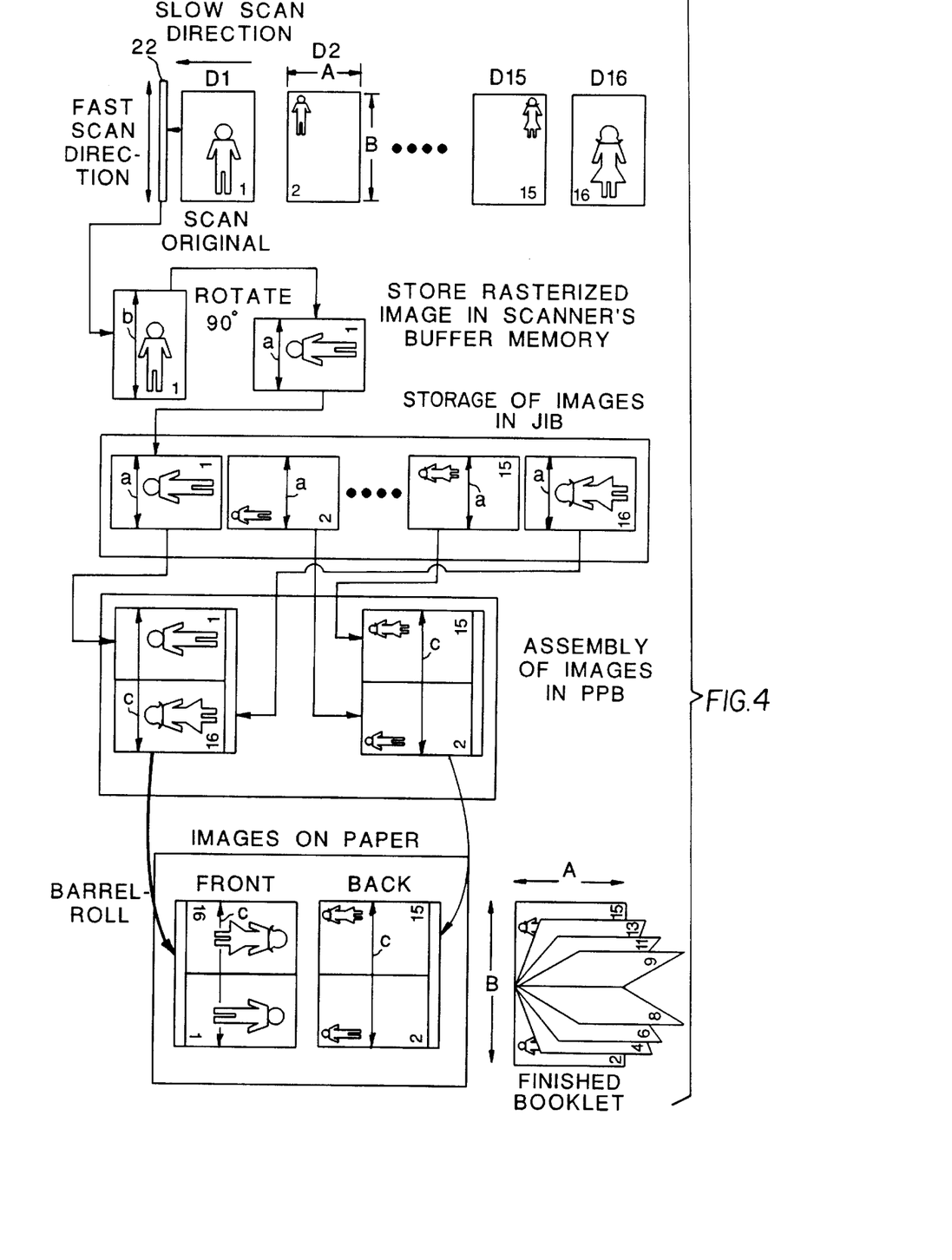
FIG. 4 is an illustration of pages in various stages of the method of the invention.

With reference now to FIG. 4, consider that scanner 22 is operative in conjunction with automatic document handler 20 to feed original documents from a stack of say 16 originals to be reproduced in the mini-pamphlet mode. Assume the documents are of 8 ½"×11" (or generally A×B) size and are scanned so that the long dimension of the document is scanned in the fast scan direction of the scanner 22. Document pages D1, D2 . . . D15, D16 may be scanned seriatim in accordance with the serial feed of the documents past the scanner as is well known. The relative movement of the document page past the scanner 22 is known as the slow scan direction. Associated with the image scanner is a two-page image buffer memory that can store two 8 ½"×11" pages of rasterized image data at a bit depth of up to 8-bits per pixel as an assembled page data set. As document D1 is scanned, the image data is processed by image data processing that also forms a part of image scanner 22 and is operative to effectively demagnify the image being scanned. Typically, known scanners of this type operate in a reduction or demagnification mode by both adjusting the speed of the document scanned to a faster than normal speed in the slow scan direction and by dropping bits in the fast scan direction. Of course, other operating modes for creating a demagnification condition for the data are also known. A typical demagnification ratio for reproducing 8 ½"×11" originals onto similar sized copies in pamphlet form is 64%. After the demagnified data is image processed including thresholding and other device dependent processing, also well known, the data is input in raster lines "b" and stored in the scanner's buffer memory. As the next page D2 is being scanned and processed into the scanner's buffer memory, data for the prior stored page has been rotated by 90° and read into the second page of the scanner's memory. Alternatively, the rotation of data may be made in reading the data into the JIB memory. After rotation into the scanner's second page of the buffer memory, the data is read out in rasterized lines each having the direction "a" . The data for the documents D1–D16 are stored in the JIB in compressed rasterized form as separate pages of data.

Assume with this apparatus when operating in minipamphlet mode that the backs of a duplex page are printed first. Thus, assume the first page of data to be printed is to include pages 2 and 15. Data for page 2 is decompressed or expanded to rasterized form and output from the JIB on the SO Bus to the input block 120 of the PPB 60. The data is provided in rasterized lines "a" to the PPB and suitably packed and translated for storage in the DRAM memory 112. The next page output by the JIB is page 15, which is to be assembled with page 2. In order to assemble the two pages into one double-size page, customized lines of rasterized data "a" of page 15 are read into memory 112 suitably aligned with the image data of page 1 to form a combined customized line "c" that is stored in the DRAM memory 112. In addition to combining the customized lines which effectively assembles the two separate lines into a longer combined line annotation data may also be added in a merging operation. Thus, indicia representing page numbers or other data as noted above can be merged as each page of data is input to memory 112. The data for annotation can be stored in compressed form in the JIB and when needed is output in response to signals from the JIB's microcontroller. A secondary raster image processor (RIP) may be provided in association with the JIB to provide the annotation data. This secondary RIP need not be costly since it is not required to create the annotation data at the full printing speed of the marking engine. This data, like data for the pages, is output on the SO Bus and input into input block 120. The JIB's microcontroller is programmed to provide this data as well as the order of the pages to be assembled in the PPB. Thus, as page 2 is sent to the JIB annotation data for merging with page 2 may be sent. This annotation data could include the numeral "2" which is to appear at an outer edge corner of a printed page as shown in the Figures. Similarly, the number "15" is output and merged at an appropriate location to appear at a lower outer edge corner of page 15's printed page. After pages 2 and 15 are merged and annotated with annotation data, if any, it is output to the LED writer control which synchronizes the data for output to the LED writer control on the SPP Bus.

The next page to be output to the PPB will depend upon the nature of the page production process. In outputting of the raster lines of data "c" from the DRAM memory 112, either pages on the front or the back will be subject to a barrel-roll operation. The reason for this is that in reading customized lines of data stored in DRAM memory 112 lines are typically read from the bottom of the page towards the top in this example. However, the nature of duplex reproduction provides that either the fronts or the backs have their printing from the bottom to the top of the page. Once the operation is established, the DRAM control 114 is programmed to provide a barrel-roll rotation of the data as it is output from the DRAM memory 112 to enable data to be read from the memory 112 from top to bottom. This can be simply accomplished by reading the data of assembled pages out of DRAM memory 112 by starting at the last address in memory and counting backwards for those assembled pages required to be read with the barrel roll rotation, whereas assembled pages not subject to a barrel roll rotation are read out of memory by counting up from the list address location on each raster line to the end of the line and then starting the next raster line at the next address.

Figure 5:
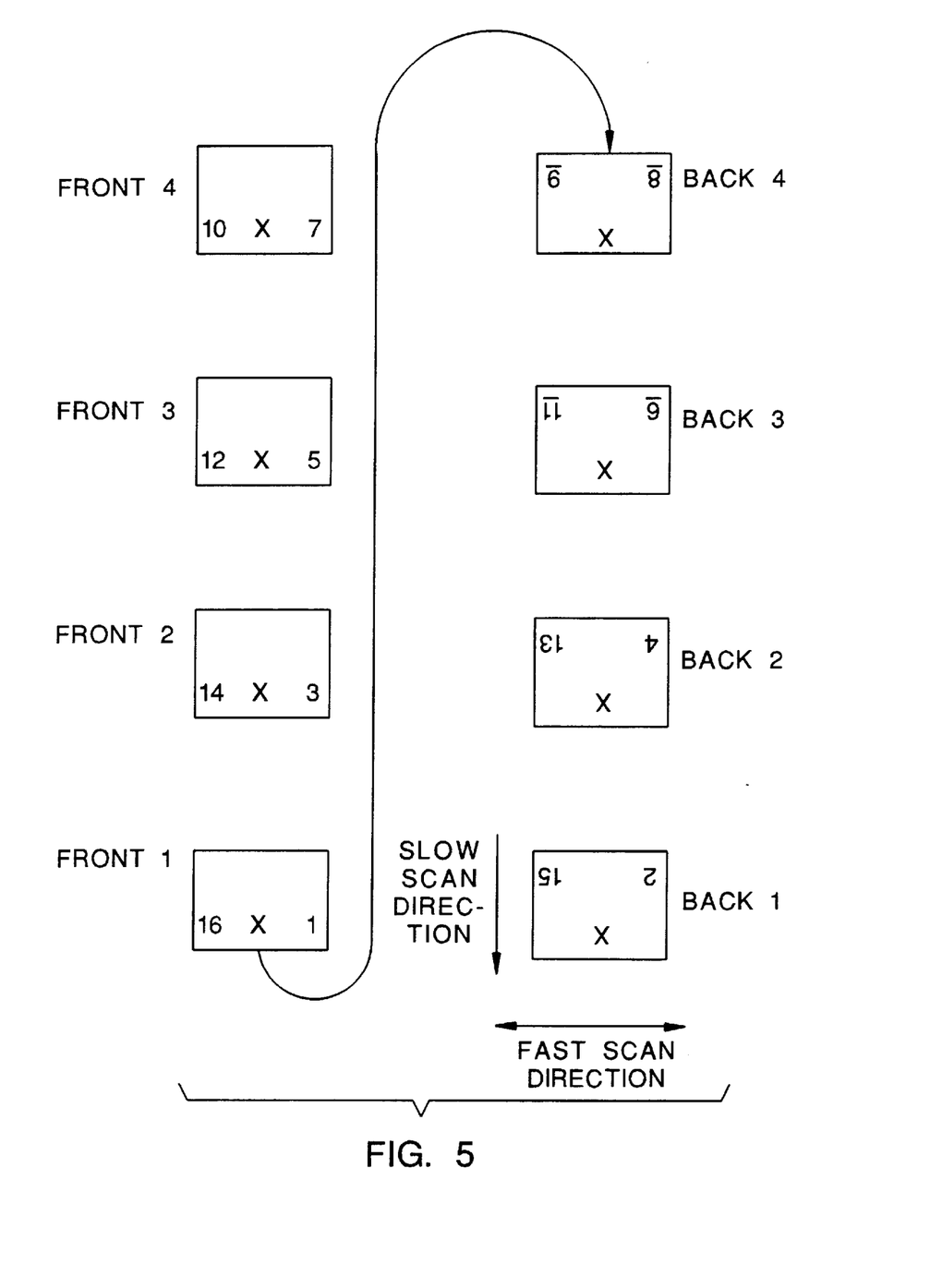
FIG. 5 are illustrations of the printing order of pages of a mini-pamphlet that is formed in accordance with the invention.

While the example of FIG. 4 shows front and backs printed right after each other, this might be the case for example, where a turnover drum is provided for producing single pass duplex or where an intermediate image transfer drum is provided. However, with the use of the apparatus of FIG. 2 it is possible that four first sides may be recorded on the photoconductor and transferred to four receiver sheets as shown in FIG. 5 and then the receiver sheets with the images fused on the backs fed back through the duplex path to receive the respective frontside images. Note in this example an "x" identifies a lead edge of a sheet as it moves into engagement with the photoconductor. This illustrates that back pages are printed from top to bottom.

Figures 6, 6A:
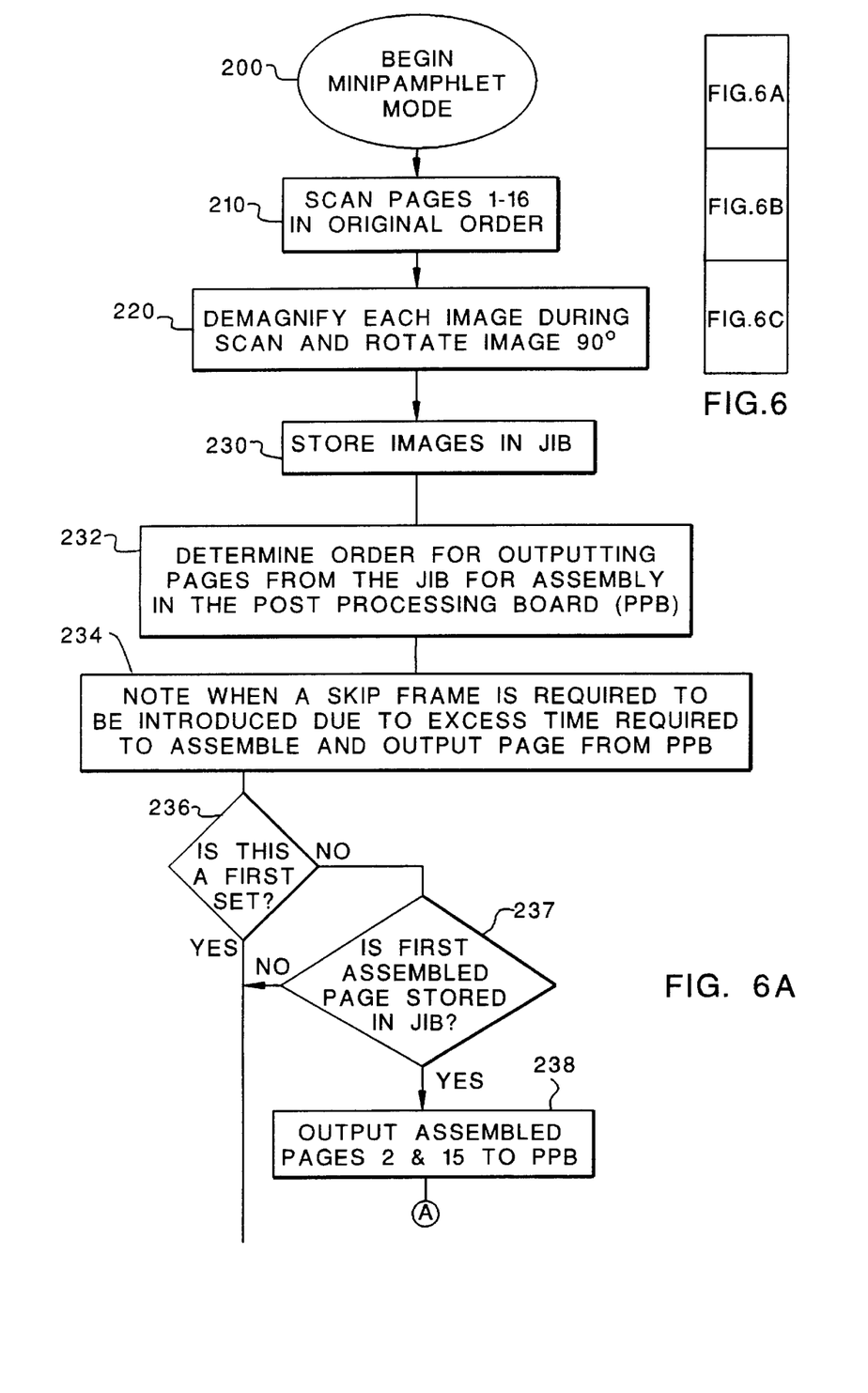
FIGS. 6A, 6B and 6C is a flowchart illustrating operation of the method and apparatus of the invention to produce the mini-pamphlet shown in FIG. 4.
Figure 6B:
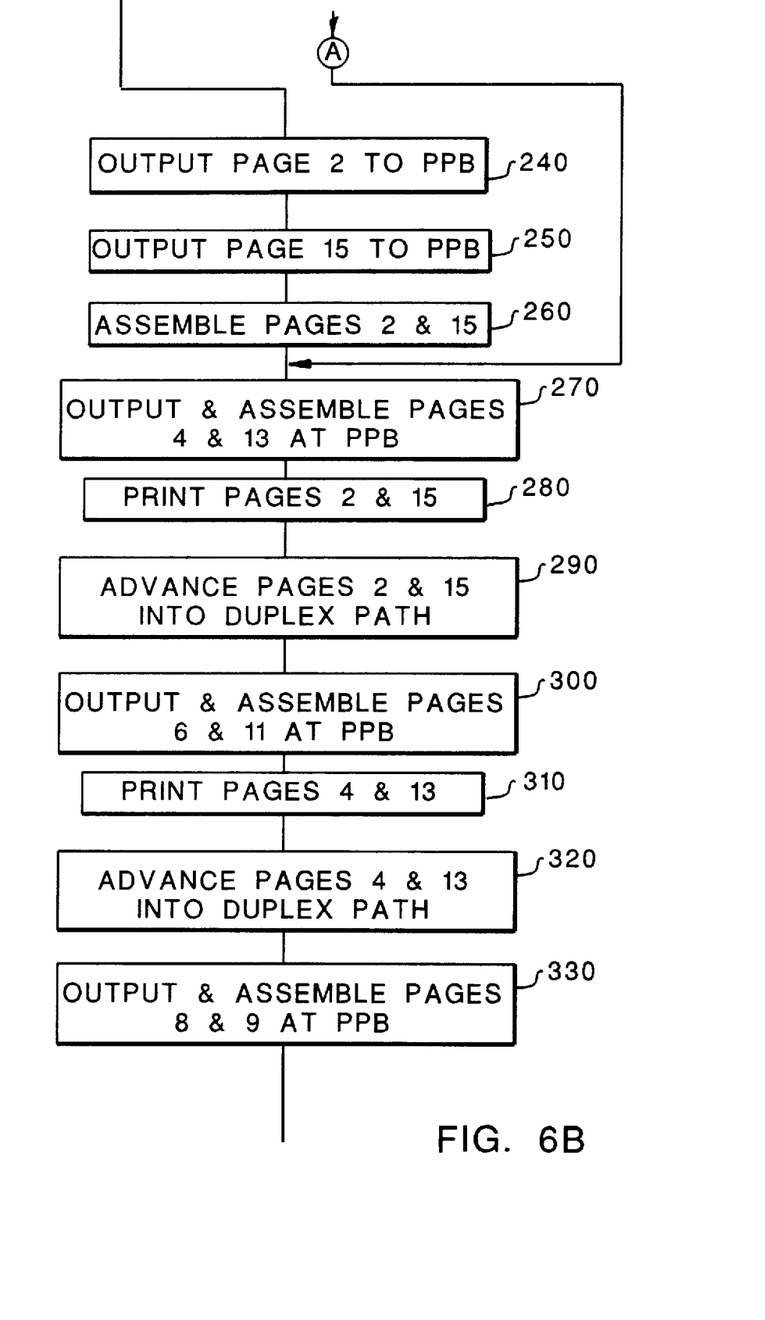
Figure 6C:
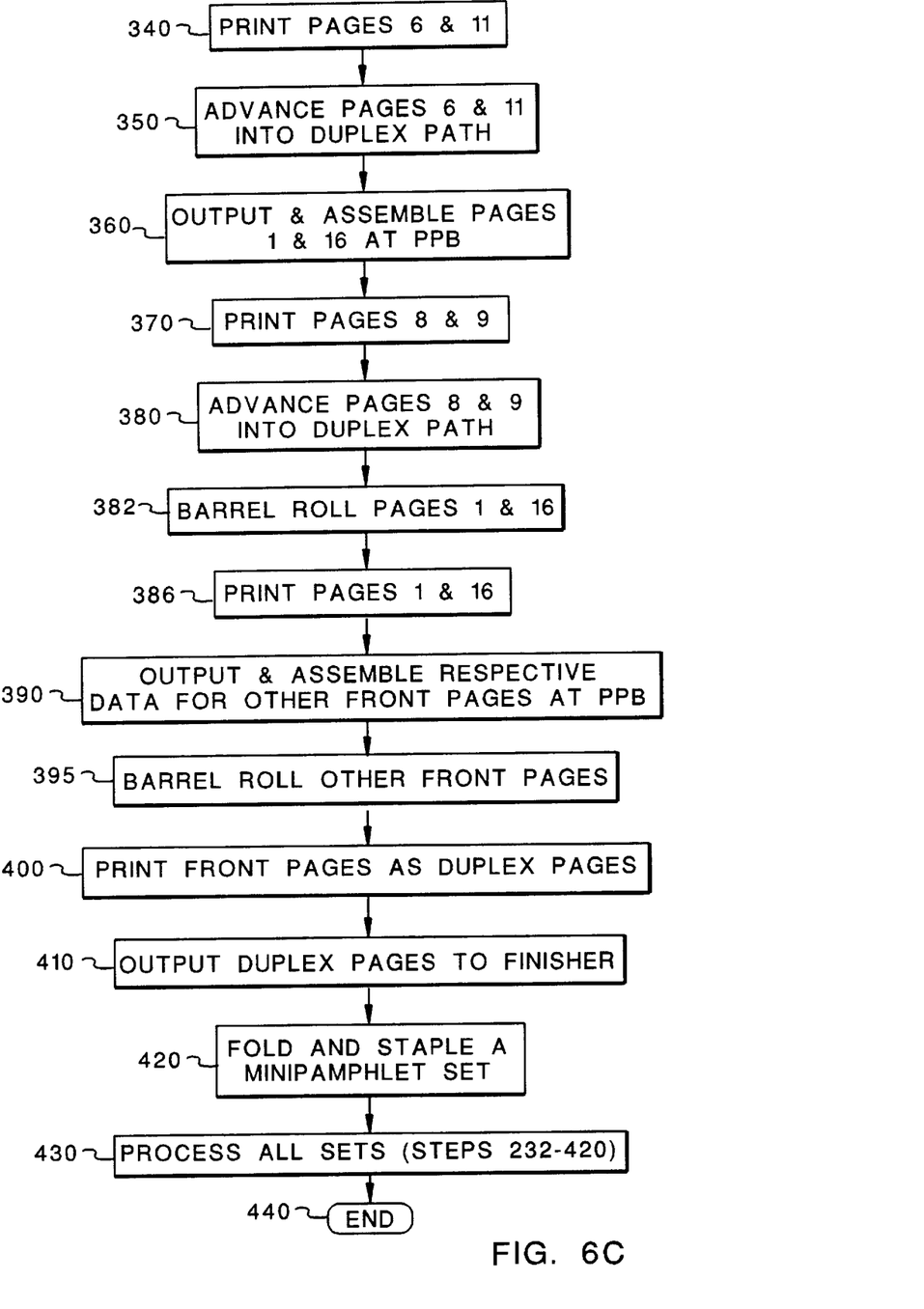

Reference will now be had with the process flow chart of FIGS. 6A–6B. Assume that mini-pamphlet mode is selected, step 200, and that as above, a 16 page simplex document of 8 ½"×11" documents is to be scanned in page order say 1–16. Document pages 1–16 are scanned serially by feeding past a scanning head, step 210. Alternatively, documents may also be scanned last page first. Both of these represent a normal page order of the multi-page document set. The scanning of each document results in the scanned image being image processed, which includes, demagnification by 64%, to be stored in the scanner's buffer memory. The processed data is then rotated by 90°, step 220, and output to the JIB wherein it is stored in compressed rasterized form in the JIB's memory, step 230. After all images of the 16 page document are stored in the JIB, the JIBs microcontroller is programmed to recognize the minipamphlet mode is selected and determines the order for outputting pages from the JIB for assembly in the PPB, step 232. Description relative to steps 234–238 is provided below. In this example, page 2 is to be output to the Post Processing Board (PPB) first, step 240. Page 15, which is to be assembled with page 2 is output to the PPB, step 250, and assembled with page 2, step 260. The assembly of two pages such as pages 2 and 15 to an assembled page data set stored in DRAM memory 112 results in identifiers associated with the assembled page data set that identify the assembled page data set as one image. Such identifiers provide indicators of line length, number of lines in image, bit depth of each pixel in the image and starting point for the address for the page in memory. The next printed page to be assembled is an assembly of original pages 4 and 13 and these are sent to the PPB, step 270, in similar fashion to that recited for steps 240–260. While pages 4 and 13 are being assembled in DRAM memory 112, assembled pages 2 and 15 are output to the printer control for printing, step 280, so that the DRAM memory can operate in ping-pong fashion with assembly of images and output to the printer occurring simultaneously. After printing of an image of assembled pages 2 and 15, the image is developed and transferred to a receiver sheet, fused to the receiver sheet and output to the duplex path, step 290. After pages 4 and 13 are assembled in DRAM memory 112, pages 6 and 11 are serially output to the PPB and assembled in DRAM memory 112, step 300, while concurrently assembled data of pages 4 and 13 are sent to the printer control for printing, step 310. A receiver sheet having the images of pages 4 and 13 is then sent to the duplex path also, step 320. In step 330, pages 8 and 9 are serially assembled at the PPB while assembled pages 6 and 11 are output for printing, step 340 and then advanced to the duplex path, step 350. In step 360, pages 1 and 16, which are to be placed on the back of pages 2 and 15, are now serially output to the PPB and assembled. Concurrently, the assembled set of image data for the last of the back pages of the set (pages 8 and 9) are now sent to the printhead, step 370, and when printed advanced into the duplex path, step 380. The assembled page set of image data for the first of the front side printings in now output from the DRAM memory 112, subjected to a barrel roll rotation and output to the printhead and printed, steps 382, 386. The above process of assembling, step 390, and printing ,step 400, the remainder of the frontsides of the remaining pages of this set is done and is similar to that described for the back-side pages with the exceptions that 1. assembled data is output from the DRAM memory 112 for the front-side pages with a barrel-roll operation, step 395 and 2. data for the front-sides are imaged on the photoconductor and transferred to the reverse side of the respective receiver sheet on which images for the backside pages have been printed, step 400. After fusing the frontside images of each receiver sheet receiving the duplexed image, the duplexed imaged sheet is sent to the finisher, step 410. The four duplex printed sheets in the set are sent to the finisher, the set is folded to form a crease line between the respective two image pages on each face of the receiver sheet and then stapled, if selected, in the crease area for example, step 420, as is usual for such pamphlets. The other sets requested may be processed in a similar manner by repeating steps 232–420, step 430, until all sets are done in which case the job is ended, step 440.

The example for production of the mini-pamphlet could be performed, as noted above, in other ways such as by forming a backside image directly after its front-side image is formed or vice versa. Other combinations of front and backside creation can be made depending upon the nature of the duplex operation or machine architecture. It will be appreciated, however, that what has been taught by my invention is a more simplified apparatus and method for producing, mini-pamphlets at full machine speed of the apparatus. Productivity is advanced over those copiers/printers known in the prior art that are not capable of producing pamphlet pages wherein images of two original pages are formed on each sheet as the longer edge is fed parallel to the cross-track direction of the photoconductive element (fast scan) so that images of both original pages are in the same raster line in the fast scan direction. For those copier/printers that are capable of creating such mini-pamphlets, they require additional hardware in the JIB to reassemble the whole document into mini-pamphlet form in the JIB before sending pages to be printed. Thus memory is provided, in the JIB to store both the original document and the reassembled document in mini-pamphlet form and in addition extra hardware is required in the JIB to decompress two images simultaneously for assembly. In the invention described herein, the post-processing board need only provide two pages of memory for assembling a document for mini-pamphlet form. In addition, further advantage is obtained by providing on this board the capability to do annotation of data in an efficient way.

In accordance with the invention, there is also provided increased productivity for production of pamphlets by minimizing skip frames necessitated by the assembly of pages that are relatively more time consuming to produce. As noted above, an objective of the invention is to reproduce pamphlets or booklets more efficiently by providing for higher productivity through producing the pages of each booklet with the long dimension of each sheet parallel to the cross-track dimension of the photoconductor or writer. As this necessitates the expansion from the JIB of more than two pages of data and/or annotations, the time for expansion of these pages and assemblage of those two pages in DRAM memory buffer 112 can become a factor in requiring a skip frame to be introduced. A determining factor may be the actual area of the pages from the JIB including annotations. If the sum of the areas of the pages and an annotation to be assembled is more than the normal image area plus inter-image area a skip frame introduction may be mandated, and the pamphlet page will be printed after the skip frame is made. The determination of a need for a skip frame can be made by the microcontroller 52 prior to when printing begins. The data of the assembled page is also recirculated back to the JIB via bus 42, MUX 18*a* under control of microcontroller 52. The data for the assembled page that is recirculated to the JIB is compressed and stored in the JIB in compressed form. For each subsequent set that is produced, the microcontroller is programmed to recall which of the assembled pages were stored in the JIB during the process of forming a copy of the first set. If an assembled page is already formed in the JIB then the assembled page is output from the JIB by expanding the data for the assembled pages, say pages 2 and 15, illustrated in steps 234, 236, 237, and 238, as an example, in lieu of assembling the pages at the PPB. A pre-assembled page is output from the JIB and sent to the PPB and stored in DRAM memory 112 for output to the writer. In most instances, this can reduce the necessity for a skip frame. Steps similar to those shown for steps 236–238 may be provided for each page to be assembled so that as many pages requiring storage of a pre-assembled page as necessary to avoid a skip frame during subsequent production sets can be accommodated. Typically, data rates may be adjusted so that skip frames become necessary only when annotations of significant size are merged with the page data. Thus, without annotation skip frames may not be needed.

There has thus been disclosed an improved method and apparatus for production of signatures in a highly productive and efficient manner.

The invention has been described in detail with particular reference to preferred embodiments thereof and illustrative examples, but it will be understood that variations and modifications can be effected within the spirit and scope of the invention.

Although the invention has been described with regard to assembling image data of two pages into an assembled page data set, the invention is not limited to two pages since signature pages are known that have four pages per side, eight pages per side with more than one fold. Thus, two or more pages can be assembled into an assembled page data in a post-processing board and output for printing so that one raster line is a composite of the two or more pages. In lieu of building an assembled page data set in the PPB, the invention also contemplates that parts of two pages may be assembled in the PPB and sent to the writer and described herein and thus a full assembled page data set may not exist in the PPB. Other modifications may include providing an algorithm for determining when to recirculate an assembled page data set back to the JIB. For example, when there are only a few copy sets requested, the algorithm may decide that skip frames that are required to be introduced for certain pages be introduced during production of such pages for each set. This may not even involve loss of productivity if the size of the duplex path relative to the production operation is such that a skip frame might be required periodically. Thus, the timing of the skip frame may be made to coincide with when such a skip frame is desirable for producing a more time consuming assembled page data set.

I claim:

1. A reproduction method comprising the steps of:

storing in a job image buffer (JIB) image data in compressed form representing multiple pages of an original image to be reproduced as signatures;

expanding the image data from compressed form to a rasterized form;

outputting to a secondary buffer memory from the JIB rasterized image data of one of two pages of the original image to be combined into a signature;

subsequent to the step of outputting said one of two pages, outputting to the secondary buffer memory from the JIB rasterized image data of a second of the two pages to be combined into a signature;

assembling image data from the two pages in the secondary memory to form an assembled data set of image data from the two pages;

merging annotation data with image data of a page after expansion of image data of a page from compressed form to a rasterized form;

outputting to a writer rasterized lines of image data representing data from the assembled data set wherein a rasterized line includes image data from the two paces of the original image;

printing the rasterized lines of data in a fast scan direction of the writer to form an image of the assembled page as a signature; and producing and assembling plural pages of signatures to form a booklet of signatures.

2. The method of claim 1 wherein the assembled data set represents two entire pages of the original image.

3. The method of claim 1 wherein the original comprises a multi-page hard copy document and the pages are scanned in an order different from which they are printed.

4. The method of claim 1 and wherein the annotation data is data for identifying a number of a page.

5. The method of claim 4 wherein the original comprises a multi-page hard copy document and the pages are scanned in an order different from which they are printed.

6. The method of claim 4 including compressing the assembled data set;

storing the compressed assembled data set in the JIB;

expanding the compressed assembled data set; and printing subsequent sets of signature reproductions, after producing a signature reproduction as part of a first set, using rasterized lines of image data representing data from the assembled set stored in the JIB in a fast scan direction of the writer, wherein a rasterized line includes image data from the two pages.

7. The method of claim 1 including subjecting data from the two pages to a barrel roll rotation.

8. The method of claim 1 including compressing the assembled data set;

storing the compressed assembled data set in the JIB;

expanding the compressed assembled data set; and printing subsequent sets of signature reproductions, after producing a signature reproduction as part of a first set, using rasterized lines of image data representing data from the assembled data set stored in the JIB in a fast scan direction of the writer, wherein a rasterized line includes image data from the two pages.

9. The method of claim 8 and including determining if a skip frame is required before printing the assembled page during production of a first reproduction of the assembled page; and, if a skip frame is required, storing the assembled data set in compressed form in the JIB for use in printing of subsequent reproductions of the assembled data.

10. The method of claim 1 and including determining if a skip frame is required before printing the assembled page during production of a first reproduction of the assembled page; and, if a skip frame is required, storing the assembled data set in compressed form in the JIB for use in printing of subsequent reproductions of the assembled data.

11. A reproduction method comprising:

storing in a job image buffer (JIB) image data representing multiple pages of an original to be reproduced as a signature;

outputting from the JIB rasterized data of one of two pages of the original to be combined into a signature;

outputting from the JIB rasterized data of a second of two pages to be combined into a signature;

buffering data from the two pages;

subjecting data from the two pages to a barrel roll rotation;

outputting to a writer rasterized lines of image data representing data from the two pages wherein a rasterized line includes image data from the two pages of the original image; and printing the rasterized lines of data in a fast scan direction of the writer to form an image of the two pages.

12. The method of claim 11 and including determining if a skip frame is required before printing the image of the two pages; and, if a skip frame is required, storing the two pages in compressed form in the JIB for use in printing of subsequent reproductions of the two pages.

13. The method of claim 11 including assembling data from the two pages so that in the buffering step the two pages are stored as an assembled page data set of image data from two pages.

14. The method of claim 13 including compressing the assembled data set;

storing the compressed assembled data set in the JIB;

expanding the compressed assembled data set; and printing subsequent sets of signature reproductions, after producing a signature reproduction as part of a first set, using rasterized lines of image data representing data from the assembled set stored in the JIB in a fast scan direction of the writer, wherein a rasterized line includes image data from the two pages.

15. The method of claim 14 and including determining if a skip frame is required before printing the assembled page during production of a first reproduction of the assembled page; and, if a skip frame is required, storing the assembled data set in compressed form in the JIB for use in printing of subsequent reproductions of the assembled data.

16. The method of claim 13 and including determining if a skip frame is required before printing the assembled page during production of a first reproduction of the assembled page; and, if a skip frame is required, storing the assembled data set in compressed form in the JIB for use in printing of subsequent reproductions of the assembled data.

17. A reproduction apparatus comprising:

a job image buffer (JIB) primary memory for storing image data in compressed form representing multiple pages of an original image to be reproduced as a signature;

means for expanding the image data of one page of the signature from compressed form to a rasterized form and subsequently expanding image data of a second page of the signature page from compressed form to a rasterized form;

means for assembling data from one page and the second page in a secondary memory to form an assembled data set in rasterized form of image data from the two pages as an assembled page;

means for outputting to a writer means rasterized lines of image data representing data from the assembled data set wherein a rasterized line includes image data from the two pages of the original image; and writer means for printing the rasterized lines of data in a fast scan direction of the writer means to form an image of the assembled page;

means for determining if a skip frame is required before printing the assembled page during production of a first reproduction of the assembled page; and, means operative, if a skip frame is required, for storing the assembled data set in compressed form in the JIB for use in printing of subsequent reproductions of the assembled data.

18. A reproduction apparatus comprising:

a first buffer for storing image data representing multiple pages of an original image to be reproduced as signatures;

means for assembling data from one page and the second page in a second buffer to form an assembled data set of image data from the two pages;

means for outputting to a writer means rasterized lines of image data representing data from the assembled data set wherein a rasterized line includes image data from the two pages of the original image; and writer means for printing the rasterized lines of data in a fast scan direction of the writer means to form an image of the assembled page and means, responsive to a determination that a skip frame is required before printing the assembled page during production of a first production of the assembled page, for storing the assembled data set in the first buffer for use in printing of subsequent reproductions of the assembled data, image data for storage in said first buffer.

19. The apparatus of claim 18 and wherein the assembled data is stored in said second buffer in rasterized form.

20. The apparatus of claim 18 and means for compressing image data for storage in said first buffer.

21. The apparatus of claim 20 and wherein the assembled data is stored in said second buffer in rasterized form.

22. A reproduction method comprising the steps of:

storing in a job image buffer (JIB) primary memory image data in compressed form representing multiple pages of an original image to be reproduced as signatures;

expanding the image data from compressed form to a rasterized form;

outputting to a secondary buffer memory from the JIB rasterized image data of one of two pages of the original image to be combined into a signature;

subsequent to the step of outputting said one of two pages, outputting to the secondary buffer memory from the JIB rasterized image data of a second of the two pages to be combined into a signature;

assembling image data from the two pages in the secondary memory to form an assembled data set of image data from the two pages;

outputting to a writer rasterized lines of image data representing data from the assembled data set wherein a rasterized line includes image data from the two pages of the original image;

printing the rasterized lines of data in a fast scan direction of the writer to form an image of the assembled page as a signature;

storing the compressed and assembled data set in the JIB;

expanding the compressed assembled data set; and printing subsequent sets of signature reproductions, after producing a signature reproduction as part of a first set, using rasterized lines of image data representing data from the assembled data set stored in the JIB in a fast scan direction of the writer, wherein a rasterized line includes image data from the two pages.

23. The method of claim 22 wherein plural assembled pages of signatures are produced and assembled to form a booklet of signatures.

24. The method of claim 22 and including determining if a skip frame is required before printing the assembled page during production of a first reproduction of the assembled page; and, if a skip frame is required, storing the assembled data set in compressed form in the JIB for use in printing of subsequent reproductions of the assembled data.

25. A reproduction method comprising the steps of:

storing in a job image buffer (JIB) primary memory image data in compressed form representing multiple pages of an original image to be reproduced as signatures;

expanding the image data from compressed form to a rasterized form;

outputting to a secondary buffer memory from the JIB rasterized image data of one of two pages of the original image to be combined into a signature;

subsequent to the step of outputting said one of two pages, outputting to the secondary buffer memory from the JIB rasterized image data of a second of the two pages to be combined into a signature;

assembling image data from the two pages in the secondary memory to form an assembled data set of image data from the two pages;

outputting to a writer rasterized lines of image data representing data from the assembled data set wherein a rasterized line includes image data from the two pages of the original image;

printing the rasterized lines of data in a fast scan direction of the writer to form an image of the assembled page as a signature; and determining if a skip frame is required before printing the assembled page during production of a first reproduction of the assembled page, and if a skip frame is required, storing the assembled data set in compressed form in the JIB for use in printing of subsequent reproductions of the assembled data.

26. The method of claim 25 wherein plural assembled pages of signatures are produced and assembled to form a booklet of signatures.

27. The method of claim 26 and including merging of annotation data with image data of a page after expansion of image data of a page.

28. A reproduction method comprising the steps of:

storing in a job image buffer (JIB) image data representing multiple pages of an original to be reproduced as a signature;

outputting from the JIB rasterized data of one of two pages of the original to be combined into a signature;

outputting from the JIB rasterized data of a second of two pages to be combined into a signature;

assembling data from the two pages and buffering data from the two pages so that the two pages are stored as an assembled data set of image data from the two pages;

outputting to a writer rasterized lines of image data representing data from the two pages wherein a rasterized line includes image data from the two pages of the original image; and printing the rasterized lines of data in a fast scan direction of the writer to form an image of the two pages.

29. A reproduction method comprising:

storing in a job image buffer (JIB) image data representing multiple pages of an original to be reproduced as a signature;

outputting from the JIB rasterized data of one of two pages of the original to be combined into a signature;

outputting from the JIB rasterized data of a second of two pages to be combined into a signature;

buffering data from the two pages;

outputting to a writer rasterized lines of image data representing data from the two pages wherein a rasterized line includes image data from the two pages of the original image; and printing the rasterized lines of data in a fast scan direction of the writer to form an image of the two pages;

determining if a skip frame is required before printing the image of the two pages; and if a skip frame is required, storing the two pages in compressed form in the JIB for use in printing of subsequent reproductions of the two pages.

* * * * *